United States Patent [19]

Hildebrand

[11] 4,248,473

[45] Feb. 3, 1981

[54] SUN-SHADE AUXILIARY DEVICE FOR VEHICLE

[76] Inventor: Otto J. Hildebrand, 809 Tecumseh, Indianapolis, Ind. 46201

[21] Appl. No.: 21,002

[22] Filed: Mar. 16, 1979

[51] Int. Cl.³ .............................................. B60J 3/00
[52] U.S. Cl. ................................. 296/97 G; 296/97 H
[58] Field of Search ................. 296/97 R, 97 B, 97 C, 296/97 G, 97 H

[56] References Cited

U.S. PATENT DOCUMENTS

| 2,784,028 | 3/1957 | Swider et al. | 296/97 K |
| 3,333,887 | 8/1967 | Dryden | 296/97 R |
| 3,371,955 | 3/1968 | Herrington, Sr. | 296/97 G |
| 3,865,428 | 2/1975 | Chester | 296/97 G |
| 4,005,899 | 2/1977 | Rigney | 296/97 G |

FOREIGN PATENT DOCUMENTS 820386  11/1951  Fed. Rep. of Germany ........ 296/97 G Primary Examiner—John J. Love
Assistant Examiner—Ross Weaver
Attorney, Agent, or Firm—Robert A. Spray

[57] ABSTRACT

A sun-shade auxiliary device for a vehicle, providing an auxiliary panel means supported by the vehicle's sun visor, with provisions by which the auxiliary panel means may be moved and fixedly held in a plurality of optional positions to provide substantially greater sun-glare protection. The plurality of optionally-available movements and positions include (a) translatory movement longitudinally of the sun visor, for incrementally freeing successive portions of a composite panel for incremental addition of glare-blocking in the direction of movement, and permitting individual adjustment of incrementally increasing numbers of panel members which provide the composite auxiliary panel means, (b) rotation about an axis parallel to the longitudinal axis of the sun visor, (c) rotation of elemental portions of the auxiliary panel means about axes perpendicular to that longitudinal axis, and (d) combinations of those three adjustments; and the invention further provides a ball joint in the support arm of either the vehicle's sun visor or of a support arm of the auxiliary panel means, thereby providing even greater option of adjustment.

10 Claims, 14 Drawing Figures

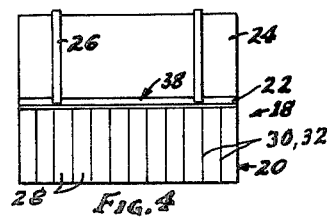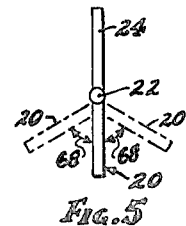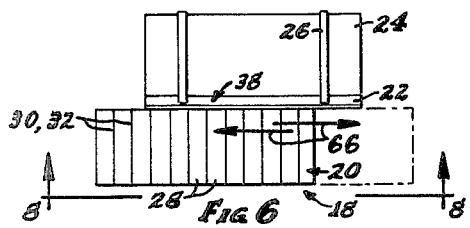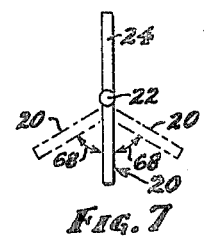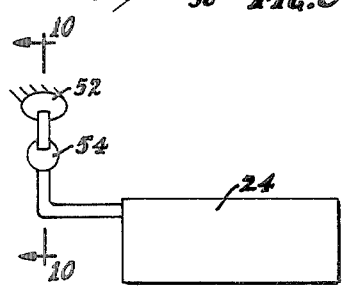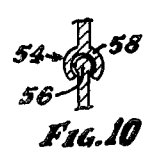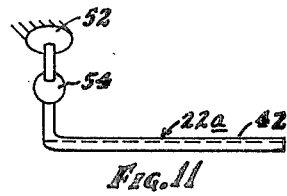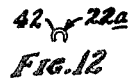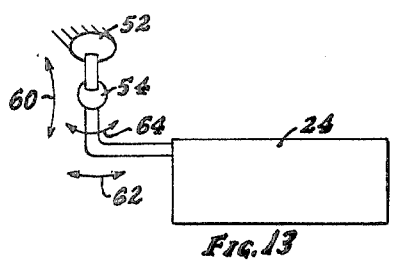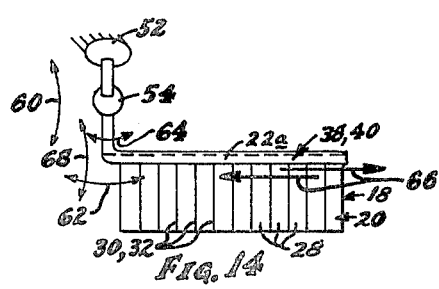

SUN-SHADE AUXILIARY DEVICE FOR VEHICLE

The present invention relates to a sun-shade auxiliary device for a vehicle; and the inventive concepts provide an auxiliary panel means with provisions by which it may be moved and fixedly held in a plurality of optional positions to provide substantially greater sun-glare protection.

Although sun visors themselves are of course well known, and although certain supplements and modifications have been proposed in the prior art, none provides the high utility and advantage of a plurality of adjusted positions, by which the glare of the sun's rays may be blocked even if coming from angles which are not blockable by other sun visors.

The plurality of optionally-available movements and positions provides that the vehicle driver's vision is protected against substantially all directions of the sun's rays; and those adjustments include (a) translatory movement longitudinally of the sun visor, for incrementally freeing successive portions of a composite panel for incremental addition of glare-blocking in the direction of movement, and permitting individual adjustment of incrementally increasing numbers of panel members which provide the composite auxiliary panel means, (b) rotation about an axis parallel to the longitudinal axis of the sun visor, (c) rotation of elemental portions of the auxiliary panel means about axes perpendicular to that longitudinal axis, and (d) combinations of those three adjustments; and the invention provides further optional adjustability by the provision of a ball joint in the support arm of either the vehicle's sun visor or of a support arm of the auxiliary panel means, thus providing even greater option of adjustment, and thus further assuring that the dangerous sun glare may be blocked regardless of its direction.

Thus it is seen that great driving safety and great driver comfort and convenience are provided, and the positional adjustment is readily and conveniently achieved.

Conventional or prior art sun visors simply do not have the needed adjustability for blocking the sun's rays when the vehicle is facing certain directions; and this is particularly dangerous and hazardous when it is recalled that often the glaring nature of the sun-rays is abruptly and instantly imposed onto a driver, by a turn of a corner or other direction-changes of a vehicle, thus meaning that a convenient and instantaneous adjustment of the visor panel is particularly desirable and advantgeous, as provided by these inventive concepts.

Prior art modifications or supplements to conventional sun visors are now discussed, as illustrative of the prior art attempts to solve the problem of dangerous sun glare.

For example, the U.S. Pat. to G. L. Kelly (Pat. No. 2,070,208) illustrates a sun visor or glare shield having a plurality of panels; however, the Kelly device does not provide the plurality of positions of optional adjustment which are provided by the concepts of the present invention.

The U.S. Pat. No. 2,485,440, to F. Friedheim likewise illustrates a device which has an auxiliary glare shield mounted onto a main glare shield of an automobile. However, this device, similar to the disadvantages of the Kelly device with respect to the present application, does not provide the several positions of optionally-selectable adjustment which are provided by the concepts of the present invention.

Another of the prior art attempts at shielding against sun-rays coming from odd directions is illustrated by the U.S. Pat. No. 2,965,416, of E. Dryden. This patent illustrates the provision of an auxiliary sun shield panel which is pivotally supported for swinging movement onto a support member of another sun shield panel. However, this modification also fails to provide the desired plurality of adjustments which are provided by the concepts of the present invention.

Another attempt of the prior art is illustrated by the U.S. Patent to F. E. Holladay, U.S. Pat. No. 3,837,703; and this also is a patent which shows an auxiliary sun shield as mounted onto a vehicle sun visor, but without the plurality of adjustments here provided.

Other prior art has been asserted to be Herrington U.S. Pat. No. 3,371,955 of 3/1968; Chester U.S. Pat. No. 3,865,428 of 2/1975; Swider et al U.S. Pat. No. 2,784,028 of 3/1957; Rigney U.S. Pat. No. 4,005,899 of 2/1977; Dryden U.S. Pat. No. 3,333,887 of 8/1967; and Bayer German Pat. No. 820,386 of 11/1951. However, even the Herrington device, which shows a multi-panel shade, and the Chester device, which shows a translatory and pin-and-tube connector means, fail to show or suggest any translatory movement which opens successive panel members in an incremental manner for individual adjustment, and they fail to show or suggest the relief of portions of the connector pin for achieving relative rotation of individual panel members about a vertical axis which otherwise would be blocked by the presence of the connector pin material. The other references of this group are even more remote.

These examples of the prior art illustrate the long and continuing search for an improved sun shield protection for the vison of a vehicle driver. More particularly, they illustrate the long-recognized need for this additional sun-glare protection, and they illustrate the fact that the prior art has attempted to achieve this additional sun-glare protection by the provision of auxiliary panel means of one sort or another. Nevertheless, none of these provides the plurality of adjustments which are provided by the present invention, and which is a key to the high advantage of the present invention, with respect to both driver safety, and driver convenience, and the comfort of the driver by avoiding for him the need to either hold his head in an odd position, or squint, or hold his hand up in some sort of a manual attempt to shield his eyes, when the sun is coming from certain directions which are not effectively blockable by conventional sun visors, not even by sun visor auxiliary apparatus such as is illustrated by these prior patents.

The above description is of an introductory and generalized nature, particularly to mention the general objects and achievements and desirability of the present invention.

More particular, and specific concepts, features, and details are set forth in the following more detailed description of embodiments illustrative of the invention'-concepts, taken in conjunction with the accompanying drawings.

In those drawings, which are somewhat schematic and diagrammatic in nature, it will be noted as follows:

FIG. 1 is an elevational view showing the sun visor auxiliary panel means, according to the concepts of the present invention, as mounted upon the sun visor of an associated vehicle; and, in this FIG. 1, the auxiliary panel means of the present invention is shown as shifted longitudinally of the vehicle's sun visor, by a translatory movement which is one of the optional features of adjustment of position which is provided by the present invention;

FIGS. 4 through 8 are diagrammatic sketches which illustrate positions of adjustment as achieved by the present invention; more particularly, FIG. 4 is an illustration of the sun visor auxiliary as mounted upon the vehicle's sun visor;

FIG. 5 is an end elevation of the assembly shown in FIG. 4, but illustrating, in chain lines, optional positions of adjustment as may be achieved by rotation of the auxiliary panel means about an axis which is parallel to the longitudinal axis of the vehicle's sun visor;

FIG. 6 is an elevational view, similar to FIG. 1, showing the adjustment of the auxiliary panel means by a translatory shifting of the auxiliary panel means longitudinally of the vehicle's sun visor;

FIG. 7 is an end elevational view, similar to FIG. 5, also showing the rotational adjustment in chain lines of the auxiliary panel means even though the auxiliary panel means has been shifted longitudinally of the sun visor, as is illustrated in FIG. 6;

Figure 1:
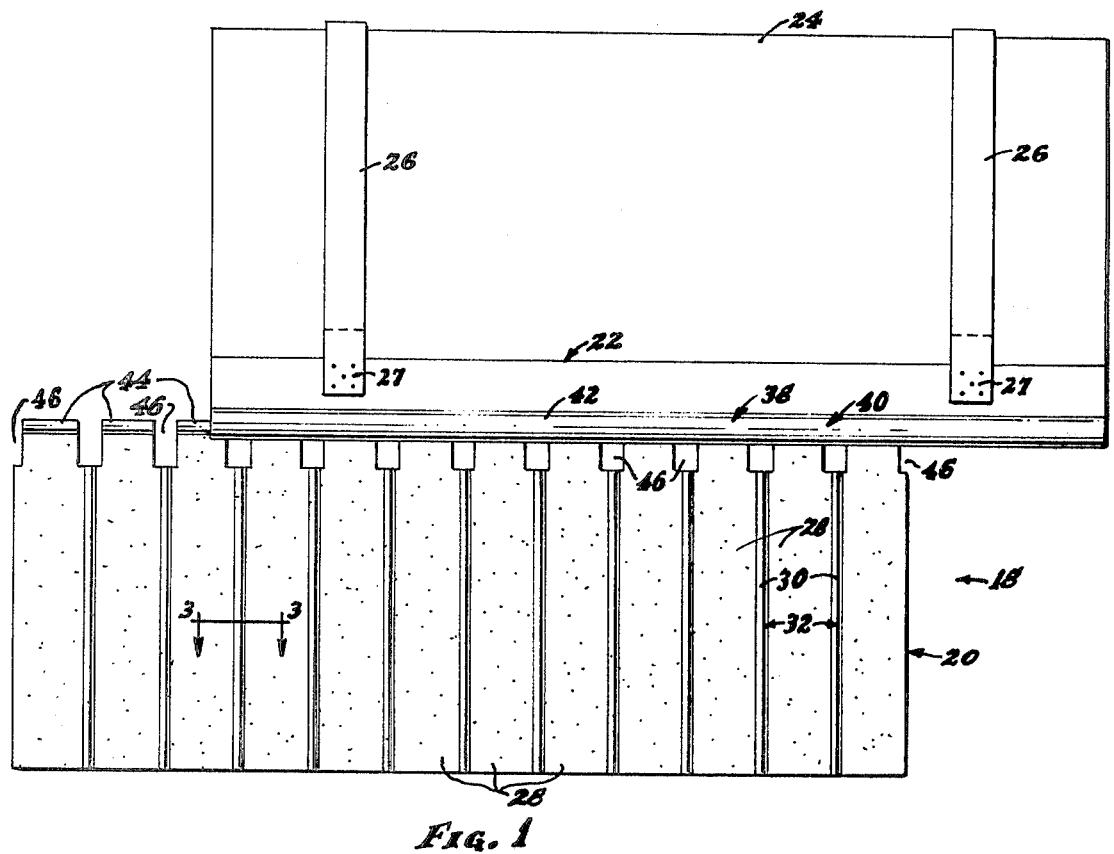
Figure 2:
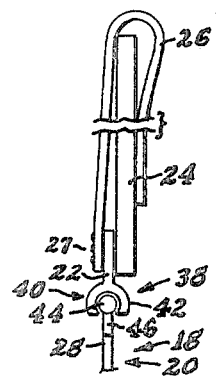
FIG. 2 is a fragmental end elevation view of the device as shown in FIG. 1, particularly illustrating the mounting means thereof.

FIG. 8 is an illustrative sketch, which is taken as shown by the View-Line 8—8 in FIG. 6, particularly illustrating the optional adjustment achieved by the present invention, in that elemental portions of the auxiliary panel means may be relatively rotated about axes which are perpendicular to the longitudinal axes of the vehicle's sun visor, and thus also perpendicular to the axis of rotation as indicated in FIGS. 5 and 7;

FIG. 9 is a view illustrating an embodiment in which a ball-and-socket joint is provided in the support arm of the vehicle's sun visor;

FIG. 10 is a fragmental cross-sectional view, through the ball-and-socket joint of FIG. 9, and is taken generally as indicated by Section-Line 10—10 of FIG. 9;

FIG. 11 is an elevational view of another embodiment of the invention, in which the support arm for the auxiliary panel means is not supported by the vehicle's sun visor as in all of the FIG. 1 through 8, but, instead, is supported through a support arm mounted onto the vehicle framing, and with a ball-and-socket joint shown as provided in that support arm;

FIG. 12 is an end elevational view of the support arm shown in FIG. 11;

FIGS. 13 and 14 illustrate the positions of adjustment as are achieved by the embodiments shown in FIGS. 9 and 11; more particularly, FIG. 13 illustrates the positions of adjustment of a conventional sun visor which is supported in the manner illustrated in FIG. 9; and FIG. 14 illustrates a modified sun visor panel, generally in the form illustrated in FIGS. 1 through 8, except that the support of this modified panel is by support directly from the car framing rather than by being mounted onto the car's conventional sun visor.

As shown in the drawings, the present invention provides a sun-shade auxiliary device 18 for a vehicle; and the general components of the embodiment of FIGS. 1 through 8 are seen to be an auxiliary panel means 20 and an elongated support mount body member 22. These components, and their construction and operational details and features, are now described in detail In the embodiment of FIGS. 1 through 8, the said support mount body member 22 is supported from the vehicle by mounting onto the vehicle's sun shield 24; and as shown this support is by a pair of U-shaped clamp or clip members 26 which are hooked over the vehicle's sun shield 24, they being shown connected to the bar 22 by rivets 27.

The auxiliary panel assembly 20 is shown as provided by a plurality of panel members or elements 28 the entirety of which have an overall length substantially no more than that of support bar 22, and all individually of the width substantially less than the length of bar 22, and all panel elements 28 having opposite edges 30 parallel to one another; and there are first interconnection means 32 which interconnect each one of the parallel edges 30 of each one panel 28 respectively with the adjacent one of the parallel edges of the adjacent panel element or member 28.

These panel members 28, thus movably interconnected, provide the composite nature of the panel means 20 whose respective portions or elements are movable with respect to one another about a plurality of parallel axes, those axes being the axes of these first interconnection means 32.

Further, it is noted, as shown, that these first interconnection means 32 are such as to permit relative rotation of the adjacent interconnected panel elements or members 28 about the axis of their interconnection means 32, thus achieving an adjustability indicated in FIG. 8. That is, the individual panel elements 28 may be relatively rotated, in and between positions (34, 36) of adjustment indicated by the chain-lines of FIG. 8.

Further adjustability is provided by second interconnection means 38 which interconnect the composite panel means 20 to the support mount body member 22 in a manner which permits translatory movement of the composite panel means 20 relative to the said support mount body member 22, in an incremental manner, exposing successive panel elements 28 to be freed from support bar 22 for their individual adjustment about axes 32 and individual or successive additions of glare-blocking to the side of the location of support bar 22. Also, there is provided relative rotation of the said composite panel means 20 with respect to the said support mount body member 22 about the axis of said translatory movement, that is, an axis parellel to the longitudinal axis of the vehicle's sun shield 24.

The fit of the components of the two interconnection means 32 and 38 is such that relative movement of the components is permitted, yet provides enough friction, resilient deformation, or tightness of fit, that an adjusted position of the components is retained at whatever setting or adjustment the driver desires.

As shown, the said second interconnection means 38 comprises an elgonated pin and socket joint 40 whose members are carried respectively by the support body member 22 and the composite panel means 20, this being shown here as the socket member 42 of the second interconnection means 38 being provided by the support mount body means 22, and the pin 44 thereof is provided by the composite panel means 20.

It will be noted, as shown, that adjacent at least one of the parallel opposite edges 30 of each of the panel elements or members 28, a portion of the second interconnection means 38 is relieved as shown at 46; and this relief 46 avoids any of that portion of the second interconnection means 38 being disposed outwardly of the plane of the respective panel members 28, thus permitting relative rotation of the adjacent panel members 28 in spite of the fact that they carry portions (pin members 44) of the said second interconnection means 38 which extend outwardly of the plane of their respective panel member 28 and would therefore interfere by abutting the adjacent panel member 28 or its component or pin 44 of the second interconnection means 38.

The relief 46, just mentioned, is here shown as recess means 46 which are provided in each of the panel members 28 which comprise the composite panel means 20 adjacent their pin components 44 of the second interconnection means 38, permitting that relative rotation of the adjacent panel members 28 in spite of what otherwise would be the interference mentioned above.

Figure 3:
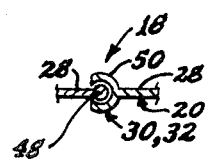
FIG. 3 is a fragmental cross-sectional detail view, shown as taken generally along Section-Line 3—3 of FIG. 1.

In the form shown in the embodiment of FIGS. 1 through 8, the first interconnection means 32 of panel elements 28 is provided by a pin and socket joint (FIG. 3) extending along each of the said parallel edges 30 of each panel member 28 of the composite panel means 20; and, as shown in FIG. 3, the pin member is indicated by numeral 48, and the socket by numeral 50, these being provided by or at the respective edges 30 of each panel element 28.

In the embodiment of FIGS. 11, 12, and 14, the support mount body member 22a is supported by the vehicle framing or vehicle components 52 supported thereby, but independent of support from any vehicle sun visor 24 as in the embodiment of FIGS. 1 through 8.

Further adjustability is shown by the embodiments of FIGS. 9 and 11. That is, as shown in FIGS. 9 and 11, and by the detail view of FIG. 10, the support from the car framing 52 includes a ball-and-socket joint 54 which includes relatively movable support components (ball 56 and socket 58) by which the body member 22a is provided to have adjustability indicated by FIGS. 13 and 14, rotation 60 about an axis parallel to its axis, and rotation 62 of it about a first axis adjacent an end thereof, and rotation 64 of it about a second axis adjacent that same end thereof but in a plane generally perpendicular to the plane of its rotation 62 about the first axis.

The plurality of adjustability provisions are indicated in the drawings by movement-indicator arrows as follows: in FIG. 6, the arrows 66 indicate the translatory and incremental adjustability parallel to the axis of the vehicle's sun visor 24; in FIGS. 5 and 7 the indicator arrows 68 indicate the rotation about that axis; in FIG. 8 the indicator arrows 70 indicate the rotation about the axes 32 by which each of the individual panel components 28 are movably joined; and, as to FIGS. 13 and 14, the reference arrows 60, 62, and 64 have already been identified.

The embodiment shown in FIGS. 9 and 13 illustrates the use of a ball joint component 54 in combination with a sun visor 24 to which the auxiliary sun visor panel 20 is not connected; nevertheless, the provision of the ball and socket joint 54 does provide extra adjustability as indicated.

SUMMARY

It is thus seen that a sun shield auxiliary device according to these embodiments of the present invention is very advantageous in contrast to conventional or prior art vehicle sun shields; for the inventive concepts provide very advantageous and convenient optional use of a plurality of adjustment features, achieving both safety, convenience, and driver-comfort.

Accordingly, it will thus be seen from the foregoing description of the invention according to these illustrative embodiments, considered with the accompanying drawings, that the present invention provides a novel vehicle sun shield auxiliary which achieves these desirable goals and advantageous features herein set forth, achieving desired advantages and characteristics, and accomplishing the intended objects, including those hereinbefore pointed out and others which are inherent in the invention.

Modification and variations may be effected without departing from the scope of the novel concepts of the invention; accordingly, the invention is not limited to the specified form or arrangement of parts herein described or shown for illustration of the inventive concepts. Thus, as herein used, the terms "sun-shade" or "sun-visor" or "sun-shield" are used generally herein in the inclusive sense as also meaning an anti-glare device to block whatever is the source of glare, be it the sun, or an oncoming vehicle's headlights, etc.

What is claimed is:

1. A sun-shade device for a vehicle, comprising:

an elongated support mount body member;

means supporting the said support mount body member from the vehicle;

a plurality of panel members having opposite edges parallel to one another;

first interconnection means which interconnect each one of the said parallel edges of each one panel respectively with the adjacent one of the said parallel edges of the adjacent panel member, the said panel members so interconnected thus providing a composite panel means whose respective portions are movable with respect to one another about a plurality of parallel axes;

said interconnection means being such as to permit relative rotation of the adjacent interconnected panel members about the axis of their interconnection means; and second interconnection means which interconnect each panel member of the composite panel means to the said support mount body member in a manner which permits translatory movement of the composite panel means relative to the said support mount body member and also relative rotation of the said composite panel means with respect to the said support mount body member about the axis of said translatory movement;

the overall length of the composite panel means, as provided by the plurality of individual panel members, being substantially no more than the overall length of the elongated support mount body member, and the entirety of the individual panel members being individually of a width substantially less than the overall length of the elongated support mount body member, thus providing that the composite panel means will have substantially no extension outwardly of the elongated support mount body member unless the composite panel means is translated along the axis of the second interconnection means, that translatory movement of the composite panel means thus incrementally exposing the individual panel means outwardly of the elongated support mount body member to a position, clear of said body member, in which individual ones of an adjacent pair of said individual panel members may be relatively rotated about the axis of the first interconnection means between the pair of individual panel members.

2. The invention as set forth in claim 1 in a combination in which the said second interconnection means comprises an elongated pin and socket joint whose members are carried respectively by the said support mount body member and the said composite panel means.

3. The invention as set forth in claim 2 in a combination in which the socket of said second interconnection means is provided by the said support mount body means, and the pin thereof is provided by the composite panel means.

4. The invention as set forth in claim 1 in a combination in which, adjacent at least one of the said parallel opposite edges of the said panel members, its portion of the said second interconnection means is relieved, thereby avoiding any of that portion of the said second interconnection means being disposed outwardly of the plane of the respective panel member, and permitting relative rotation of the adjacent panel members in spite of the fact that they carry portions of the said second interconnection means which extend outwardly of the plane of their respective panel member and would therefore interfere by abutting the adjacent panel member or its said second interconnection means.

5. The invention as set forth in claim 1 in a combination in which recess means are provided in the panel member which comprise the composite panel means adjacent the said second interconnection means, permitting relative rotation of the adjacent panel members in spite of the fact that they carry portions of the said second interconnection means which extend outwardly of the plane of their respective panel member and would therefore interfere by abutting the adjacent panel member or its said second interconnection means.

6. The invention as set forth in claim 1, in a combination in which the said first interconnection means is provided by a pin and socket joint exending along each of the said parallel edges of each panel member of the composite panel means.

7. The invention as set forth in claim 1, in a combination in which the said elongated support mount body member is provided with means for supportingly attaching it to the vehicle's sun visor panel.

8. The invention as set forth in claim 1, in a combination in which the said elongated support mount body member is supported by the vehicle framing or vehicle components supported thereby but independent of support from any sun visor.

9. The invention as set forth in claim 1, in a combination in which the support means for the said elongated support mount body member includes relatively movable support components by which the said body member is provided to have rotation about an axis parallel to its axis, and rotation of it about a first axis adjacent an end thereof, and rotation of it about a second axis adjacent that same end thereof but in a plane generally perpendicular to the plane of its rotation about said first axis.

10. The invention as set forth in claim 9 in a combination in which the said relatively movable support components comprise a ball and socket joint.

* * * * *

UNITED STATES PATENT AND TRADEMARK OFFICE
CERTIFICATE OF CORRECTION

PATENT NO. : 4,248,473
DATED : February 3, 1981
INVENTOR(S) : Otto J. Hildebrand It is certified that error appears in the above—identified patent and that said Letters Patent is hereby corrected as shown below:

Col. 2, line 57:  Delete comma after the word "particular".

Col. 2, line 59:  Add "'s" on word invention and delete " (-) " at end of line.

Col. 7, line 30:  The word "member" should be -- members--.

Col. 8, line 7:  The word "exending" should be -- extending --.

Signed and Sealed this

Eighteenth Day of May 1982

[SEAL]

Attest:

GERALD J. MOSSINGHOFF

Attesting Officer   Commissioner of Patents and Trademarks